Patented Jan. 4, 1944

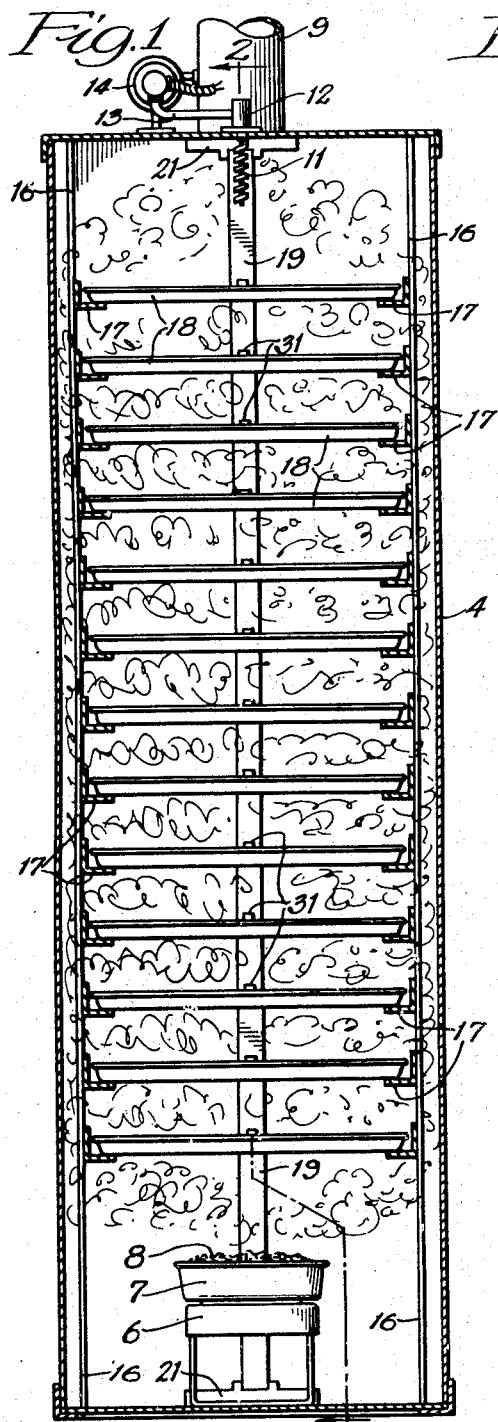
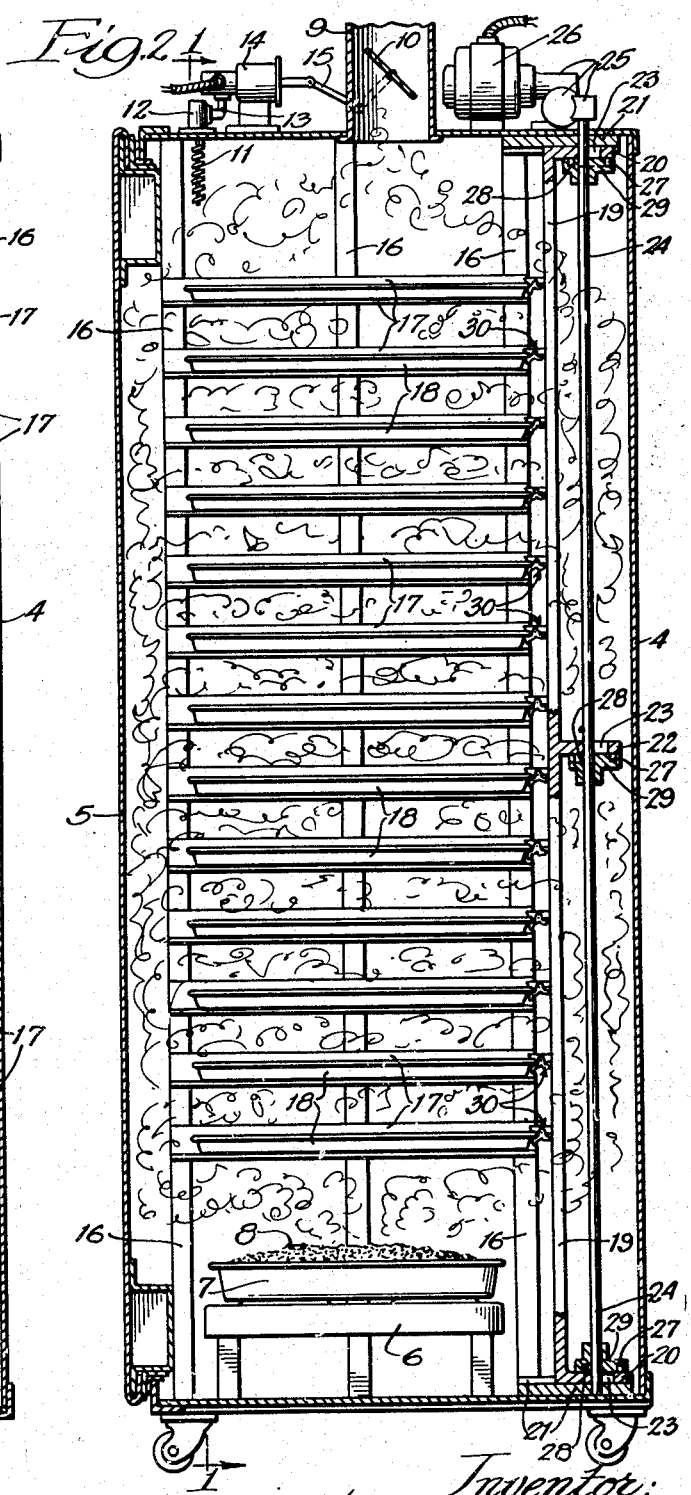
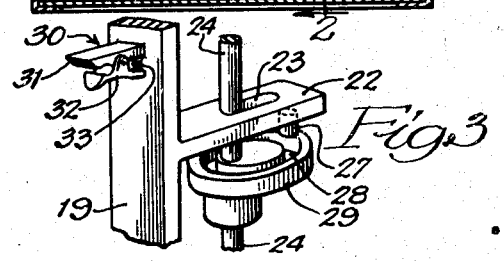

2,338,156

UNITED STATES PATENT OFFICE 2,338,156

SMOKE-LADEN FLOUR AND METHOD OF PRODUCING SAME

Hugh E. Allen, Northbrook, Ill., assignor of one-half to Albert G. McCaleb, Evanston, Ill.

Application November 22, 1940, Serial No. 366,629

2 Claims. (Cl. 99—140)

My invention contemplates and provides a novel product in the form of a smoke laden flour which is admirably adapted to be incorporated, as a binder, in ground meats such as are utilized in making various kinds and varieties of sausages.

For many years progressive sausage manufacturers keenly have appreciated the need for, and hopefully have awaited the advent of, a healthful, reasonably uniform, satisfactorily usable, and economically produced, grain cereal binder capable of carrying the flavor and aroma of wood smoke to and into the meat protein constituents of sausage casing fillers. Such a binder would permit eliminating, or minimizing, of the usual sausage smoking operation with consequent elimination, or minimization, of one of the greatest problems of makers of smoked sausages, i. e., the shrinkage inevitably caused by smoking sausages as such.

But despite long standing need and demand for a grain cereal binder having the above enumerated characteristics, the exact nature of such a binder, and the method whereby to produce same, remained unknown, until my concept and practice of what is disclosed and taught by the instant specification.

Prior efforts to provide a grain cereal binder characterized by the flavor and aroma of wood smoke have involved the introduction into flour of either "liquid smoke" or viscous liquids in the nature of condensates obtained from the destructive distillation of wood. The products of such efforts have not satisfied the requirements of practical sausage manufacturers.

The admixture of any of the varieties of so-called "liquid smoke" with flour to impart smoke flavor and aroma to the flour was not and is not practicable for a number of reasons, one of these being that any measure of "liquid smoke" capable of imparting any significant strength of wood smoke flavor to any given quantity of flour will convert the flour into a pasty or doughy mass which is neither marketable (or suitable for use) as such, nor susceptible of being easily or effectively processed into marketable condition.

The commingling with flour of viscous liquids in the nature of condensates obtained from the destructive distillation of wood was not and is not practicable because of the prohibitive cost of producing such condensates, because of the presence therein of certain very undesirable aldehydes and ketones as well as deleterious wood fiber residues, because of the difficulty—well nigh impossibility—of uniformly intermixing them with the flour, and because of the tendency of such condensates to render the flour pasty or doughy.

So much for the prior art and the reasons why the prior art could not and did not meet the needs and requirements of the sausage making industry for a healthful and otherwise acceptable and usable sausage casing filler binder in the nature of a cereal grain flour richly endowed with the flavor and aroma of hard wood smoke.

The product of the present invention is a cereal grain flour having commingled therewith oil soluble tars, which are extremely rich in the true flavor and aroma of hard wood smoke, and which are free from all undesirable aldehydes and ketones and deleterious wood fiber residues, such tars being broken down into minute globules which are thoroughly and uniformly distributed throughout, and maintained as separated globules by, the particles of the flour.

In producing the smoke laden flour of the present invention, I prefer that a cereal grain, in granular form and desirably in the form of whole grains, be subjected to a wood smoking operation. Such smoking operation desirably is effected at a temperature as low as 130° F. During and by such wood smoking operation some of the whole grains, or lesser granules of the grain, become individually coated with oil soluble wood smoke tars. Then such grains, or the lesser granules of the grain, and the smoke tar coatings thereof, are simultaneously milled to reduce the whole grains, or lesser granules of the grain, to flour and to break up the oil soluble smoke tars into minute globules which are thoroughly and uniformly distributed among and throughout the particles of such flour.

These and other features, objects and advantages of the present invention will more clearly appear from the following detailed description and discussion of product, method, and illustrative apparatus wherewith to effect that step in the method which consists in the smoking of the whole grains or lesser granules of the grain.

In the accompanying sheet of drawings,

Fig. 1 is a vertical sectional view of an equipment which may be utilized in smoking the whole grains or lesser granules of the grain, this view being taken on the line 2—2 of Fig. 2 and looking in the direction indicated by the arrows;

Fig. 2 is a vertical sectional view taken on the line 2—2 of Fig. 1 and looking in the direction indicated by the arrows; and Fig. 3 is a fragmentary detail view of part of the mechanism which may be utilized to agitate the whole grains, or the lesser granules of the grain, during the smoking thereof.

Similar characters of reference refer to similar parts throughout the several views.

In the drawing numeral 4 indicates a cabinet, much like a conventional locker cabinet, having a suitably hinged horizontally swinging door 5, which is desirably equipped with a handle latch (not shown). The walls, top, bottom and door of the cabinet are preferably formed of metal so that they will effectively conduct excess heat from the interior of the cabinet to the surrounding atmosphere.

Disposed on the floor of the cabinet is an electric heater or hot plate 6 on which is disposed a pan 7 adapted to contain a quantity 8 of hard wood saw dust, e. g., hickory saw dust.

The upper portion of the cabinet is provided with a flue 9, which, if desired, may be controlled by a thermostatically actuated damper or butterfly valve 10. The thermostat, responding to temperature in the top of the cabinet, may be of any one of several suitable types. The thermostat depicted in the accompanying drawing may be assumed to comprise a coil 11 which, by its expansion and contraction under temperature changes, serves to operate an electrical switch (not shown) located in housing 12. A conduit 13 may be assumed to protect circuit conductors through which the switch in the housing 12 controls electro-magnetic mechanism (not shown) located in housing 14, such electro-magnetic mechanism being connected through linkage 15 with damper 10. I prefer that the thermostat shall be adjusted to operate the damper to maintain in the cabinet an average operating temperature which is at least as low as 130° F.

Disposed in the cabinet, and spaced from the side walls thereof are fixed vertical bars 16 to which are welded or otherwise secured the metal angle bars 17 on which trays 18 are slidably disposed in superposed and spaced relationship.

I shall now describe mechanism which, if desired, may be utilized to move the trays 18 horizontally to and fro on their supports 17, and thus gently agitate the contents of the trays, during the smoking operation. Disposed in the cabinet near the rear end thereof is a vertically disposed bar 19 which is capable of a certain amount of rectilinear horizontal reciprocation in and with respect to the cabinet, such bar 19 having horizontally turned extremities 20—20 cooperating with guide members 21—21 carried by the top and bottom of the cabinet. Bar 19 is also provided, intermediate its ends, with a horizontally rearwardly extending arm 22. Formed in such arm 22, and also in each of the aforementioned bar extremities 21, is an elongated slot 23 for the accommodation of a vertically disposed rotatable shaft 24 which may be driven, through suitable gearing 25, by an electric motor 26 supported on the exterior of the cabinet top. The arm 22 of the bar 19, and also each of the bar extremities, is provided with a pin 27 which extends into the cam channel 28 of an adjacent eccentric 29 fixed upon shaft 24. Rotation of shaft 24 will be translated, by eccentrics 29 and their cooperating pins 27, into rectilinear horizontal reciprocation of the vertically disposed bar 19.

On its forward face the bar 19 carries a plurality of latches 30, each of such latches being adapted frictionally but releasably to engage the curled edge of one of the trays 18 when the tray is disposed upon its appropriate supports 17 and moved rearwardly thereon into the embrace of the latch. The arrangement is such that a positive forward pull on the tray will release it from its associated latch without directly manually manipulating the latch, notwithstanding that the latch does engage the tray, and effect its horizontal to and fro movement, whenever the horizontal reciprocatory movement of the vertically disposed bar 19 occurs. Each latch 30 comprises a fixed jaw 31, a pivotally mounted movable jaw 32, and a spring 33 which tends to bias the forward end of the movable jaw toward the corresponding end of the fixed jaw.

It should be understood that the temperature controlling thermostat and damper operated thereby, as well as the mechanism for gently agitating the material undergoing the smoking operation, are not indispensables in an equipment which may be used in practicing the method of the present invention. They are, however, excellent, although optional, adjuncts to such an equipment.

By "cereal grain" as the words are used in this specification, I mean either whole grains or lesser particles of one or more of corn, oats, wheat, rye, barley, rice, navy beans, soya beans, lentils, peas, etc.

In practicing the method of my present invention, to produce the new product thereof, I prefer to place whole cereal grains in the trays 18 which are then placed in the cabinet 4 and upon the tray supports 17. On being so placed, the trays are pushed into the embrace of the latches 30 if the grains are to be gently agitated while being smoked. It is preferred that each tray shall contain but a relatively small leveled out quantity of the grains so that the depth of the tray contents will be quite small and the upper or exposed surface of such contents of considerable area.

The pan 7 is then filled with hard wood saw dust, placed upon the heater 6, the heater put into operation, and the door of the cabinet 4 closed. The cabinet quickly fills with a dense, fragrant smoke.

The heater is kept in operation for such period as has been found suitable for the particular grains being smoked, e. g., approximately two hours.

The motor 26 may be energized to cause gentle agitation of the grains during all or any portion of the smoking period.

At the end of the smoking period the trays are removed from the cabinet. At that time it will be found that all or most of the grains have become coated with a tarry substance (oil soluble wood smoke tars).

After the grains have been thus smoked, i. e., coated with oil soluble wood smoke tars, they are placed in a suitable mill and ground to whole grain flour. The grinding of the grains after the wood smoke tars have been deposited thereon breaks down the tars into a myriad of extremely minute globules which are very uniformly distributed throughout the flour produced while such minute globules are being formed. These minute globules of the wood smoke tars, being uniformly distributed throughout the flour, and retaining their identity because separated by particles of the flour, are capable of emulsifying with the aqueous juices of the ground meats with which the smoke laden flour subsequently is intermixed in the preparation of any desired sausage casing filler.

The smoke flavor strength of my novel smoke laden flour is very high, with the result that the maximum of smoky flavor and aroma which may be needed in any given sausage, readily may be imparted to that sausage by incorporating in its casing filler a quantity of such flour which is both tolerable and desirable in good sausage making practice.

While I prefer to produce my novel smoke laden flour by smoking whole grains and then simultaneously grinding such whole grains and their smoke tar coatings, it is not necessary that the cereal grain thus smoked always shall be in the form of whole grains. Very good results can be obtained by smoking lesser granules of the grain and then grinding those lesser granules, and their tar coatings, to produce the smoke laden flour of the present invention. Among the lesser granules of grain which have been found suitable for my purpose are various kinds of grain grits, including, among others, those wheat grits commonly known as farina.

By "grits," as the term is used in this specification, I mean gritty, and relatively non-agglutinous, particles of a grain. By "lesser granules," as these words are used in this specification, I mean grits or other grain particles which are capable of being smoked and then milled along with the wood smoke tars deposited upon them during the smoking operation.

It is practicable and desirable to bolt my novel smoke laden flour before packaging same for sale to sausage makers.

Having thus described my invention what I claim is new and desire to secure by Letters Patent of the United States is:

1. The method, of producing a ground meat binder, which comprises wood smoking cereal grain at a temperature in the neighborhood of 130° F. to cause the deposit thereon of a tarry substance in substantially unabsorbed condition, and then milling the grain and the tarry substance to afford a flour having particles of the tarry substance distributed therethrough.

2. The method, of producing a ground meat binder, which comprises wood smoking cereal grain at a temperature in the neighborhood of 130° F. to cause the deposit thereon of a tarry substance in substantially unabsorbed condition, agitating the grain while smoking it, and then milling the grain and the tarry substance to afford a flour having particles of the tarry substance distributed therethrough.

HUGH E. ALLEN.